Feb. 13, 1962 P. J. BEYERLE 3,021,103
PLUMBING ASSEMBLY
Filed July 27, 1959
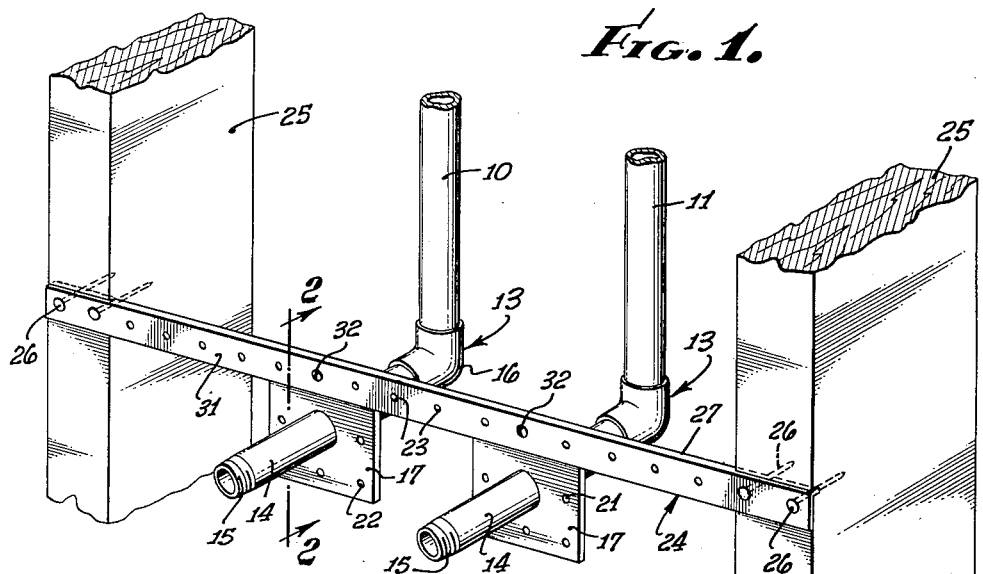
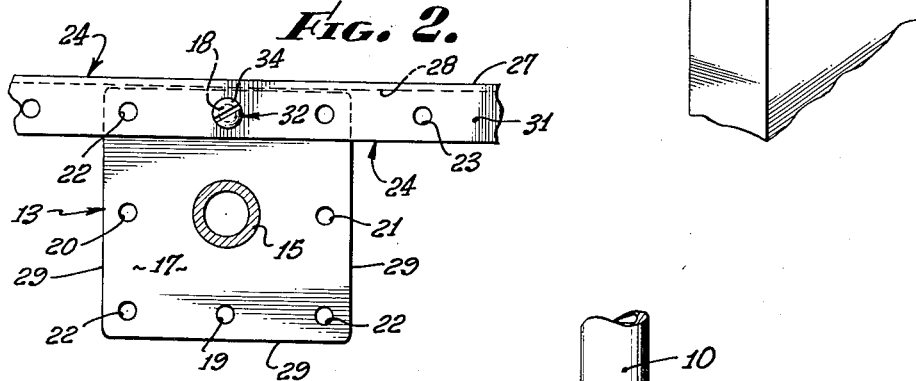
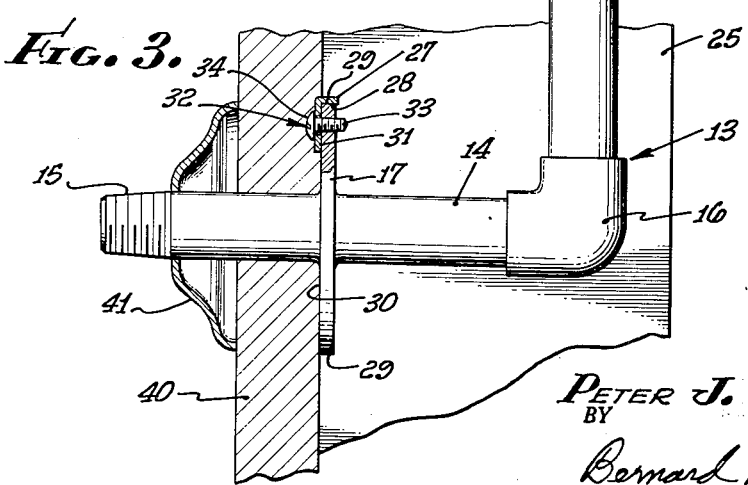
INVENTOR.
PETER J. BEYERLE
BY
Bernard Kriegel
ATTORNEY.

United States Patent Office 3,021,103
Patented Feb. 13, 1962

3,021,103
PLUMBING ASSEMBLY
Peter J. Beyerle, 2880 Wightman, San Diego, Calif.
Filed July 27, 1959, Ser. No. 829,568
5 Claims. (Cl. 248—57)

The present invention relates to plumbing fitting combinations, and to the supporting of such combinations on portions of a building.

In my United States Patent No. 2,773,708, a plumbing assembly is disclosed that can be rapidly and accurately installed in a building. The assembly incorporates a strip adapted to be fastened to the studs of a building, the strip having holes therein spaced in conformance with holes in a plumbing fitting, so that bolts can be placed through the fitting holes and aligned with strip holes for the purpose of securing the fitting to the strip.

The present invention has for an object the provision of an improved plumbing assembly, in which a plumbing fitting combination can be firmly secured to a perforated supporting strip through use of a single fastening member, such as a screw or bolt, the fitting being prevented from turning about the fastening member by the strip itself.

Another object of the invention is to provide a plumbing assembly embodying a plumbing fitting combination mounted on a perforated supporting strip in such manner that the forward portion of the fitting combination will be disposed the proper distance externally of a finished wall surface, for the ready attachment to such forward portion of a water faucet, or the like.

A further object of the invention is to provide a plumbing assembly embodying a plumbing fitting combination mounted on a perforated supporting strip, in which the fitting combination can be mounted on the strip in various angular positions, to enable one or more pipes connected to the fitting combination to extend in various selected directions therefrom. In a more limited sense the invention has for an object the easy fastening of a plumbing fitting combination to the perforated strip in various angular positions, as through use of a single fastening element, like a screw or bolt.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

FIGURE 1 is an isometric projection of a supporting strip and a plurality of plumbing fitting combinations secured thereto, applied to the studs of a wood building frame;

FIG. 2 is an enlarged sectional view taken along the line 2—2 on FIG. 1;

FIG. 3 is a side elevational view of one of the plumbing fitting assemblies, with portions shown in vertical section, as the plumbing assembly appears in relation to a finished building wall.

The invention is illustrated in the drawings by way of example as being related to the hot and cold water pipes 10, 11 of a building structure. As disclosed, a pair of plumbing fitting assemblies 13, 13 are adapted to have hot and cold water faucets (not shown) mounted thereon, such as normally used in connection with a household lavatory or sink.

A plumbing fitting combination is provided for each of the faucets, one of the combinations being adapted to be suitably secured to a cold water pipe 11 and the other to a hot water pipe 10. Each fitting combination includes a nipple portion 14 that may have a forward threaded end 15 on which a faucet (not shown), or the like, can be mounted. The rear portion of the nipple is suitably secured, as by threading or soldering, to a fitting 16, which is shown by way of example as an elbow, to which a water pipe 10 or 11 is attached, as by means of a threaded connection or by soldering. The fitting 16 could be any other specific type, such as a T, Y, X, or a straight coupling, to which the water pipe is connected.

Surrounding the nipple 14 and at an intermediate point along its length, and preferably at right angles to its axis, is a mounting plate 17, which may be soldered or brazed to the exterior of the nipple, effecting a rigid attachment of the nipple and plate to one another. This plate is of rectangular or square shape, and has holes extending through its marginal portions. Thus, as disclosed in FIGS. 1 and 2, there are upper and lower sets of holes 18, 19, as well as sets of holes 20, 21 on opposite sides of the plate. The holes 22 in the corners of the plate are common to the upper and side sets of holes 18, 20, 21 and to the lower and side sets of holes 19, 20, 21.

Each set of holes is disposed in a straight row, the holes being spaced a predetermined distance from each other, in order to conform to the uniform spacing of holes 23 in a cross bar or perforated strip 24 on which the plate is mounted, and to which it is adapted to be secured. The holes in each row 18, 19, 20, 21 of the plate are spaced from one another a distance which is a whole number multiple of the distance between the holes 23 in the strip 24. Thus, the distance between adjacent holes in the plate can be equal to the distance between the rows of holes 23 in the strip, or double such distance, or triple such distance. As disclosed, the holes in the plate are spaced from one another double the distance between the holes in the strip.

The strip 24 is adapted to extend between and overlap studs or uprights 25 of a building, and is secured thereto in any suitable manner, as by driving nails 26 through end holes 23 in the strip and into the wood studs 25. The strip is stiffened substantially by a horizontal flange 27 extending from one of its edges, as its upper edge, which flange will be driven into the wood of the upright when the strip is nailed to the latter, to assist in the firm attaching of the strip to the upright. The flange has another important purpose. Its inner surface 28 is spaced from the centers of the strip holes 23 by a distance that conforms to the distance between each straight side edge 29 of the plate and the centers of the holes 18, 19, 20 or 21 adjacent to such side edge. Thus, when a plumbing fitting combination 13 is mounted on a strip 24, the plate will be disposed with its forward face 30 engaging the inner surface of the strip leg 31, and with its upper edge 29 closely adjacent the lower surface 28 of the strip flange 27.

A single fastening element 32 can now be inserted through one hole 23 of the strip 24 and into an aligned hole on the plate. As disclosed, a self tapping sheet metal screw 32 is used as a fastening element. Its shank 33 will pass freely through the strip hole 23 and will be turned by aid of a suitable screwdriver (not shown) so that the shank cuts its companion thread in the plate portion defining the plate hole 18, 19, 20 or 21. The screw is turned until its head 34 is brought snugly against the outer surface of the leg 31 and with the plate 17 bearing against the inner surface of the leg. As disclosed in the drawings, a single screw 32 has been placed in an intermediate hole of one of the rows 18, 19, 20 or 21 of the plate. The plate cannot turn about the axis of the screw 32 since its upper edge 29 engages the flange 27. Accordingly, a single screw or other fastening element is availed of to mount the plate 17 firmly on the strip 24, which effects a mounting of the entire plumbing fitting combination 13 on the strip in the desired location along the length of the latter.

Both sets of plumbing fitting combinations 13, 13 are secured to the strip 24 in such manner that the nipple portions 14 are spaced the appropriate distance apart. Since the strip has been nailed to the forward surfaces of the studs 25, the nipples project forwardly of such surfaces by a predetermined amount. This amount is selected such that the building wall 40, when applied to the studs (such as lathe secured to the studs, and plaster placed against the lathe), will result in a projection of the forward ends 15 of the nipples the required distance out of the exposed surface of the building wall. The plumber need merely place the usual ornamental collar 41 around the threaded nipple and against the wall 40, and then thread a faucet (not shown) on each of the threaded ends 15 of the nipples, the faucet being in its proper position relative to the building wall. This is due to the fact that each plate 17 has been secured to the nipple 14 a predetermined distance along its length and from the forward end of the nipple.

Although the fitting 16 is disclosed in the drawings as being so arranged that a pipe 10 or 11 extends upwardly therefrom, the same combination can be used to enable a water pipe to extend in a different direction from the fitting. Thus, the combination 13 can be mounted on a strip 24 in such manner that the elbow 16 faces downwardly. The combination need only be fastened to the strip 180 degrees from the location illustrated, with the single screw 32, or other fastening element, passing through one of the holes of what is now illustrated as the lower set of holes 19. If desired, the combination can be mounted on the strip in such manner that the pipe secured to the fitting extends in a horizontal direction. All that need be done is to turn the combination 90 degrees from its presently disclosed position so that one of the side edges 29 of the plate is disposed against the flange 27 and a screw then placed through a hole 23 in the strip and threaded into an aligned hole 20 in the plate. Of course, the combination could be mounted so that the pipe extends horizontally in the opposite direction from the one just described, in which case the other edge of the plate will be disposed under the flange 27 and a screw 32 fastened in one of the holes 21 of the presently disclosed vertical set of holes. With the present arrangement, if the pipes 10, 11 are to be disposed horizontally, the nipple 14 would be made of sufficient length such that they extend rearwardly a sufficient distance to prevent the studs from interfering with the horizontally disposed pipes, or the studs could be appropriately notched.

From the foregoing description, it is apparent that a plumbing assembly has been provided in which the fitting combination 13 can be preselected and predetermined, such that its forward end 15 projects from the building wall 40, a specific distance, thereby enabling the faucets to be mounted on the threaded ends 15 of the nipples with assurance that the faucets are appropriately related to the external surface of the building wall, and properly spaced from one another. Each plumbing fitting combination 13 can be rapidly mounted on the strip 24 and in various selected positions, both along the strip and angularly with respect thereto, each combination being held firmly on the strip and immovable with respect thereto by a single fastening element 32. The construction of the plumbing assembly 13, 24 and of each plumbing fitting combination 13 is such that substantial savings of time are secured in the performance of the plumbing work on a building structure, with attendant substantial savings in money.

The inventor claims:

1. In a plumbing assembly: a supporting strip including a leg portion and a flange portion extending from said leg portion at a substantial angle thereto, said leg portion having a longitudinal row of equidistant holes, one or more holes at the end portions of said leg portion being adapted to receive fastening elements to secure said strip to the structural members of a building; a plumbing fitting combination including a tubular portion and a plate portion secured thereto, said plate portion having an edge and containing openings adjacent to said edge and spaced from each other by a predetermined distance such that the placing of such plate portion against said leg portion and with its edge contiguous said flange portion will enable an opening to be aligned with a hole in said leg portion; and means passing into said leg portion hole and an aligned opening to secure said plate portion to said strip with said edge contiguous said flange portion.

2. In a plumbing assembly: a supporting strip including a leg portion and a flange portion extending from said leg portion at a substantial angle thereto, said leg portion having a longitudinal row of equidistant holes, one or more holes at the end portions of said leg portions being adapted to receive fastening elements to secure said strip to the structural members of a building; a plumbing fitting combination including a tubular portion and a plate portion secured thereto, said plate portion being of rectangular shape providing four edges, said plate portion containing a row of openings adjacent to each of said four edges, the openings in each row being spaced from each other by a predetermined distance such that the placing of said plate portion against said leg portion and with an edge contiguous said flange portion will enable an opening in the row adjacent such contiguous edge to be aligned with a selected hole in said leg portion; said plate portion being adapted to be placed against said leg portion with either of its edges contiguous said flange portion and with an opening adjacent that contiguous edge aligned with a selected hole in said leg portion; and means passing into said selected leg portion hole and opening aligned therewith to secure said plate portion to said strip with an edge of said plate portion contiguous said flange portion.

3. In a plumbing assembly: a supporting strip including a leg portion and a flange portion extending from said leg portion at a substantial angle thereto, said leg portion having a longitudinal row of equidistant holes, one or more holes at the end portions of said leg portion being adapted to receive fastening elements to secure said strip to the structural member of a building; a plumbing fitting combination including a tubular portion, a tubular fitting secured to said tubular portion and having a tubular end extending at a substantial angle to said tubular portion which is less than a straight angle, and a plate portion secured to said tubular portion intermediate its ends; said plate portion being of rectangular shape providing four edges, said plate portion containing a row of openings adjacent to each of said four edges, the openings in each row being spaced from each other by a predetermined distance such that the placing of said plate portion against said leg portion and with an edge contiguous said flange portion will enable an opening in the row adjacent such contiguous edge to be aligned with a selected hole in said leg portion; said plate portion being adapted to be placed against said leg portion with either of its edges contiguous said flange portion and with an opening adjacent that contiguous edge aligned with a selected hole in said leg portion; and means passing into said selected leg portion hole and opening aligned therewith to secure said plate portion to said strip with an edge of said plate portion contiguous said flange portion.

4. In a building: spaced vertical structural members; a wall mounted on said members; a supporting strip extending across said members and including a vertical leg portion and a horizontal flange portion, said leg portion having a longitudinal row of equidistant holes; means extending through one or more holes at the end portions of said leg portion to secure said strip to said structural members; a plumbing fitting combination including a tubular portion extending through said wall and forwardly thereof a predetermined distance, and further including a vertical plate portion encompassing and secured to said tubular portion a predetermined distance from its forward end, said plate portion having an edge and containing openings adjacent to said edge and spaced from each other by a predetermined distance such that the placing of such plate portion against said leg portion and with its edge contiguous said flange portion will enable an opening to be aligned with a hole in said leg portion; and means passing into said leg portion hole and an aligned opening to secure said plate portion to said strip with said edge contiguous said flange portion.

5. In a building: spaced vertical structural members; a wall mounted on said members; a supporting strip extending across said members and including a vertical leg portion and a horizontal flange portion, said leg portion having a longitudinal row of equidistant holes; means extending through one or more holes at the end portions of said leg portion to secure said strip to said structural members; a plumbing fitting combination including a tubular portion extending through said wall and forwardly thereof a predetermined distance, and further including a vertical plate portion encompassing and secured to said tubular portion a predetermined distance from its forward end, said plate portion being of rectangular shape providing four edges, said plate portion containing a row of openings adjacent to each of said four edges, the openings in each row being spaced from each other by a predetermined distance such that the placing of said plate portion against said leg portion and with an edge contiguous said flange portion will enable an opening in the row adjacent such contiguous edge to be aligned with a selected hole in said leg portion; said plate portion being adapted to be placed against said leg portion with either of its edges contiguous said flange portion and with an opening adjacent that contiguous edge aligned with a selected hole in said leg portion; and means passing into said selected leg portion hole and opening aligned therewith to secure said plate portion to said strip with an edge of said plate portion contiguous said flange portion.

References Cited in the file of this patent

UNITED STATES PATENTS

| | | |
|---|---|---|
| 2,157,918 | Rankin | May 9, 1939 |
| 2,295,888 | Bucknell | Sept. 15, 1942 |
| 2,773,708 | Beyerle | Dec. 11, 1956 |
| 2,824,312 | Tortorice | Feb. 25, 1958 |